US009669724B2

(12) United States Patent
Sisk

(10) Patent No.: US 9,669,724 B2
(45) Date of Patent: Jun. 6, 2017

(54) OPTIMIZED FUZZY LOGIC CONTROLLER FOR ENERGY MANAGEMENT IN MICRO AND MILD HYBRID ELECTRIC VEHICLES

(71) Applicant: Johnson Controls Technology Company, Holland, MI (US)

(72) Inventor: Brian C. Sisk, Mequon, WI (US)

(73) Assignee: Johnson Controls Technology Center, Holland, MI (US)

( * ) Notice: Subject to any disclaimer, the term of this patent is extended or adjusted under 35 U.S.C. 154(b) by 0 days.

(21) Appl. No.: 14/014,117

(22) Filed: Aug. 29, 2013

(65) Prior Publication Data

US 2014/0067183 A1    Mar. 6, 2014

Related U.S. Application Data

(60) Provisional application No. 61/695,873, filed on Aug. 31, 2012, provisional application No. 61/800,241, filed on Mar. 15, 2013.

(51) Int. Cl.
*B60L 11/18* (2006.01)
*B60L 11/12* (2006.01)
(Continued)

(52) U.S. Cl.
CPC .......... *B60L 11/1861* (2013.01); *B60L 1/003* (2013.01); *B60L 1/02* (2013.01); *B60L 7/18* (2013.01); *B60L 11/005* (2013.01); *B60L 11/123* (2013.01); *B60L 11/14* (2013.01); *B60L 11/1868* (2013.01); *B60L 11/1874* (2013.01);
(Continued)

(58) Field of Classification Search
None
See application file for complete search history.

(56) References Cited

U.S. PATENT DOCUMENTS 5,778,326 A    7/1998    Moroto et al.
5,929,608 A *  7/1999    Ibaraki et al. .............. 322/16
(Continued)

FOREIGN PATENT DOCUMENTS

| CN | 202413459 | 9/2012 |
| EP | 1883552 B1 | 6/2012 |
| JP | 2003143713 | 5/2003 |

OTHER PUBLICATIONS

Goldvinsugirthadhas, B. et al, "Fuzzy Logic Based Control of DC-DC Converted For Hybrid Electric Vehicle Energy Management"; International Journal of Communications and Engineering, Mar. 1, 2012, pp. 110-115; vol. 01—No. 1.
(Continued)

*Primary Examiner* — Rami Khatib
*Assistant Examiner* — Jeffrey Boomer
(74) *Attorney, Agent, or Firm* — Fletcher Yoder, P.C.

(57) ABSTRACT

An energy storage system of a vehicle includes an energy storage device, a regulation device coupled to the energy storage device, one or more sensing devices for sensing current levels, voltage levels, temperature levels, and/or pressure levels of the energy storage device and/or on components thereof, and a control unit configured to determine dynamically a power flow in/out of the energy storage device using a fuzzy logic approach. The regulation device is configured to regulate at least one of a voltage level, a current level, and any additional state parameter of the energy storage device.

20 Claims, 11 Drawing Sheets

(51) Int. Cl.
    *B60L 1/02*     (2006.01)
    *B60L 1/00*     (2006.01)
    *B60L 7/18*     (2006.01)
    *B60L 11/14*     (2006.01)
    *B60L 11/00*     (2006.01)
    *B60W 10/08*     (2006.01)
    *B60W 20/00*     (2016.01)
    *B60W 10/26*     (2006.01)
    *B60W 20/10*     (2016.01)

(52) U.S. Cl.
    CPC .......... *B60L 11/1877* (2013.01); *B60W 10/08* (2013.01); *B60W 10/26* (2013.01); *B60W 20/00* (2013.01); *B60W 20/10* (2013.01); B60L 2200/12 (2013.01); B60L 2200/18 (2013.01); B60L 2200/32 (2013.01); B60L 2200/36 (2013.01); B60L 2200/44 (2013.01); B60L 2210/12 (2013.01); B60L 2210/14 (2013.01); B60L 2240/12 (2013.01); B60L 2240/34 (2013.01); B60L 2240/545 (2013.01); B60L 2240/547 (2013.01); B60L 2240/549 (2013.01); B60W 2510/244 (2013.01); Y02T 10/6217 (2013.01); Y02T 10/7005 (2013.01); Y02T 10/7022 (2013.01); Y02T 10/7044 (2013.01); Y02T 10/7066 (2013.01); Y02T 10/7077 (2013.01); Y02T 10/7225 (2013.01); Y02T 10/7233 (2013.01)

(56) References Cited

U.S. PATENT DOCUMENTS

| | | | |
|---|---|---|---|
| 6,304,055 B1 | 10/2001 | Winstead | |
| 6,362,602 B1* | 3/2002 | Kozarekar | 320/160 |
| 6,487,477 B1 | 11/2002 | Woestman et al. | |
| 6,646,419 B1* | 11/2003 | Ying | 320/132 |
| 7,193,391 B2 | 3/2007 | Moore | |
| 7,849,944 B2 | 12/2010 | DeVault | |
| 7,872,368 B2 | 1/2011 | Karimi et al. | |
| 8,138,720 B2 | 3/2012 | Snyder et al. | |
| 2003/0184307 A1* | 10/2003 | Kozlowski et al. | 324/427 |
| 2009/0015202 A1* | 1/2009 | Miura | 320/132 |
| 2009/0096285 A1* | 4/2009 | Acena et al. | 307/10.1 |
| 2009/0114463 A1* | 5/2009 | DeVault | 180/65.29 |
| 2010/0219007 A1* | 9/2010 | Dalum | B60K 6/12 180/65.22 |
| 2010/0222953 A1* | 9/2010 | Tang | 701/22 |
| 2011/0172867 A1* | 7/2011 | Yu | B60K 6/445 701/22 |
| 2012/0187906 A1* | 7/2012 | Martienssen et al. | 320/109 |
| 2012/0207620 A1* | 8/2012 | Dalum | B60K 6/12 417/44.1 |
| 2012/0208672 A1* | 8/2012 | Sujan et al. | 477/5 |
| 2012/0319471 A1 | 12/2012 | Miller | |
| 2013/0024055 A1 | 1/2013 | Hysko et al. | |
| 2013/0264994 A1 | 10/2013 | Schaefer | |
| 2014/0312619 A1* | 10/2014 | Plant et al. | 290/16 |
| 2015/0012144 A1* | 1/2015 | Wang | H02J 3/00 700/291 |

OTHER PUBLICATIONS

Almufti, Ali, "Parallel Hybrid Vehicles Using Fuzzy Logic Control"; DTIC Online: Information for the Defense Community; http://www.dtic.mil/dtic/tr/fulltext/u2/a513229.pdf; Dec. 17, 2009.
CN 201380056986.8 First Office Action dated Jun. 29, 2016.

* cited by examiner

OPTIMIZED FUZZY LOGIC CONTROLLER FOR ENERGY MANAGEMENT IN MICRO AND MILD HYBRID ELECTRIC VEHICLES

CROSS-REFERENCE TO RELATED APPLICATIONS

The present application claims priority under 35 U.S.C. §119(e) to U.S. Provisional Patent Application Ser. No. 61/695,873 filed Aug. 31, 2012, and to U.S. Provisional Patent Application Ser. No. 61/800,241 filed Mar. 15, 2013, which are incorporated herein by reference in their entirety.

BACKGROUND

Unless otherwise indicated herein, the materials described in this section are not prior art to the claims in this application and are not admitted to be prior art by inclusion in this section.

A vehicle that uses one or more battery systems for supporting propulsion, start stop, and/or regenerative braking functions can be referred to as an xEV, where the term "xEV" is defined herein to include all of the below described electrical vehicles, or any variations or combinations thereof.

A "start-stop vehicle" is defined as a vehicle that can disable the combustion engine when the vehicle is stopped and utilize a battery (energy storage) system to continue powering electrical consumers onboard the vehicle, including the entertainment system, navigation, lights, or other electronics, as well as to restart the engine when propulsion is desired. A lack of brake regeneration or electrical propulsion distinguishes a "start-stop vehicle" from other forms of xEVs.

As will be appreciated by those skilled in the art, hybrid electric vehicles (HEVs) combine an internal combustion engine (ICE) propulsion system and a battery-powered electric propulsion system, such as 48 volt, 130 volt, or 300 volt systems. The term HEV may include any variation of a hybrid electric vehicle, in which features such as brake regeneration, electrical propulsion, and stop-start are included.

A specific type of xEV is a micro-hybrid vehicle ("mHEV" or "micro-HEV"). Micro-HEV vehicles typically operate at low voltage, which is defined to be under 60V. Micro-HEV vehicles typically provide start stop, and distinguish themselves from "start-stop vehicles" through their use of brake regeneration. The brake regeneration power can typically range from 2 kW to 12 kW at peak, although other values can occur as well. A Micro-HEV vehicle can also provide some degree of electrical propulsion to the vehicle. If available, the amount of propulsion will not typically be sufficient to provide full motive force to the vehicle.

Full hybrid systems (FHEVs) and Mild hybrid systems (Mild-HEVs) may provide motive and other electrical power to the vehicle using one or more electric motors, using only an ICE, or using both. FHEVs are typically high-voltage (>60V), and are usually between 200V and 400V. Mild-HEVs typically operate between 60V and 200V. Depending on the size of the vehicle, a Mild-HEV can provide between 10-20 kW of brake regeneration or propulsion, while a FHEV provides 15-100 kW. The Mild-HEV system may also apply some level of power assist, during acceleration for example, to supplement the ICE, while the FHEV can often use the electrical motor as the sole source of propulsion for short periods, and in general uses the electrical motor as a more significant source of propulsion than does a Mild-HEV.

In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of xEV that include all-electric or battery electric vehicles (BEVs), plug-in hybrid electric vehicles (PHEVs), and electric vehicle conversions of hybrid electric vehicles and conventional ICE vehicles. BEVs are driven entirely by electric power and lack an internal combustion engine. PHEVs have an internal combustion engine and a source of electric motive power, with the electric motive power capable of providing all or nearly all of the vehicle's propulsion needs. PHEVs can utilize one or more of a pure electric mode ("EV mode"), a pure internal combustion mode, and a hybrid mode.

xEVs as described above may provide a number of advantages as compared to more traditional gas-powered vehicles using only ICEs and traditional electrical systems, which are typically 12 volt systems powered by a lead acid battery. For example, xEVs may produce fewer undesirable emission products and may exhibit greater fuel efficiency as compared to traditional vehicles and, in some cases, such xEVs may eliminate the use of gasoline entirely, as is the case of certain types of BEVs.

As xEV technology continues to evolve, there is a need to provide improved power sources (e.g., battery systems or modules) for such vehicles. For example, it is desirable to increase the distance that such vehicles may travel without the need to recharge the batteries. Additionally, it may also be desirable to improve the performance of such batteries and to reduce the cost associated with the battery systems.

Conventional xEVs have been found to be functionally limited by their electric energy systems that supply power to their electric motor/generator and vehicle accessories. Typically, an electric motor is powered by an energy source that needs to store energy suitable for high-power discharges as well as for electric demands generated by various driving conditions.

As discussed above, in addition to environmental concerns, the need for increased fuel economy, increased electrical loads and better energy management has driven major OEMs to consider additional fuel economy features in their vehicles, including start-stop, brake regulation, and electric propulsion ("boost"). The start stop function could reduce the fuel consumption during stops while braking energy recuperation provides the ability to recharge the battery without additional fuel. Boost allows fuel savings by using electric energy to partially propel the vehicle, reducing the load in the combustion engine.

Obtaining a high level of fuel economy from a system consisting of an ICE, an energy regenerating device, and one or more batteries requires coordination between these devices. Therefore, it is desirable to have an energy management strategy configured to maximize the utilization of an onboard energy storage system and improve vehicle fuel economy.

SUMMARY

Disclosed herein is an optimized fuzzy logic controller for energy management in micro and mild hybrid electric vehicles.

In one aspect, an embodiment of an energy storage system of a vehicle includes an energy storage device, a regulation device coupled to the energy storage device, one or more sensing devices for sensing current levels, voltage levels, temperature levels, and/or pressure levels of the energy storage device and/or on components thereof, and a control unit configured to determine dynamically a power flow in/out of the energy storage device using a fuzzy logic approach. The regulation device is configured to regulate at least one of a voltage level, a current level, and any additional state parameter of the energy storage device.

In another aspect, a micro-hybrid vehicle includes a vehicle control unit for determining operation modes of the micro-hybrid vehicle, and generating controlling signals corresponding to the operation mode, an energy storage system configured to receive the controlling signals. The energy storage system includes a first energy storage device and a second energy storage device, a regulation device coupled to the first and second energy storage devices, wherein the regulation device is configured to regulate at least one of a voltage level, a current level, and any additional state parameter of the first and second energy storage devices, one or more sensing devices for sensing current input signals and voltage input signals to at least one of the first and second energy storage devices and/or components thereof, and a control unit configured to determine dynamically a target state of charge (SOC) of each of the first and second energy storage devices based on a current vehicle speed using a fuzzy logic approach.

In yet another aspect, a computer-implemented method is provided for controlling an operation of an energy storage system of a hybrid vehicle, the energy storage system having a vehicle operation unit, a control unit, and a voltage and current regulator device, first and second energy storage devices. The method includes determining whether the hybrid vehicle is in a driving mode, and determining a speed of the hybrid vehicle when in the driving mode, determining a target SOC of each of the first and a second energy storage devices based on the hybrid vehicle speed, and determining a current SOC of each of the first and a second energy storage devices. The method further includes evaluating a difference between the target SOCs and the current SOCs, and determining dynamically using a fuzzy logic approach an amount of power available for regeneration, energy assistance, and propulsion.

These as well as other aspects, advantages, and alternatives will become apparent to those of ordinary skill in the art by reading the following detailed description, with reference where appropriate to the accompanying drawings. Further, it should be understood that the disclosure provided in this summary section and elsewhere in this document is intended to discuss the embodiments by way of example only and not by way of limitation.

BRIEF DESCRIPTION OF THE FIGURES

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
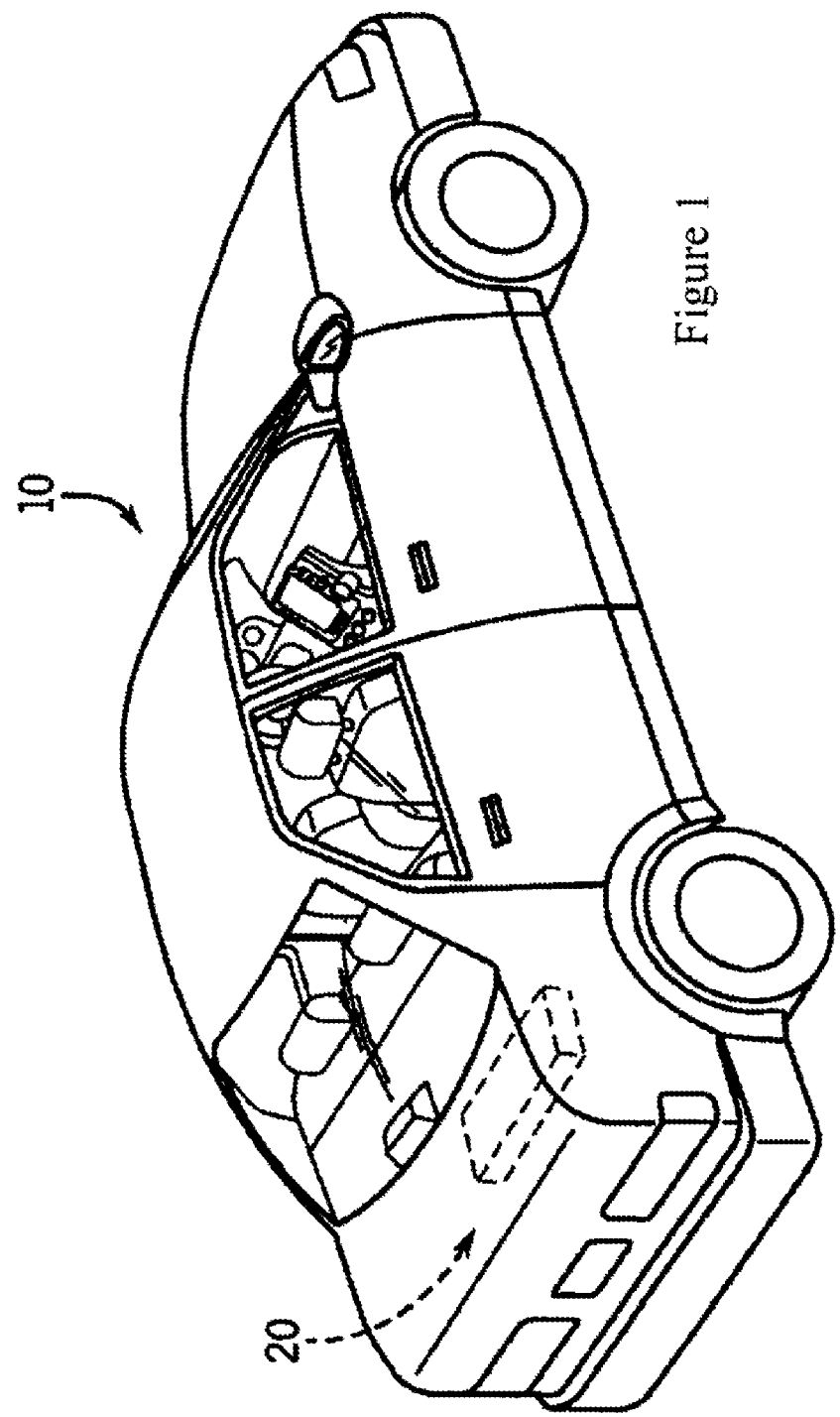
FIG. 1 is a perspective view of a vehicle (an xEV) having a battery system contributing all or a portion of the power for the vehicle, in accordance with an embodiment of the present approach.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

As discussed above, there are several different types of xEVs. Although some vehicle manufacturers, such as Tesla, produce only xEVs and, thus, can design the vehicle from scratch as an xEV, most vehicle manufacturers produce primarily traditional ICEs. Thus, when one of these manufacturers also desires to produce an xEV, it often utilizes one of its traditional vehicle platforms as a starting point. As can be appreciated, when a vehicle has been initially designed to use a traditional electrical system powered by a single lead acid battery and to utilize only an ICE for motive power, converting such a vehicle into its HEV version can pose many packaging problems. For example, a FHEV uses not only these traditional components, but one or more electric motors must be added along with other associated components. As another example, a Micro-HEV also uses not only these traditional components, but a higher voltage battery (e.g., a 48V lithium ion battery module) must be placed in the vehicle to supplement or replace the 12V lead acid battery along with other components such as a belt integrated starter-generator, sometimes referred to as a belt alternator starter (BAS) as described in further detail below.

Hence, if a battery system can be designed to reduce such packaging problems, it would make the conversion of a traditional vehicle platform into an xEV less costly and more efficient. As used herein, the BAS is not intended to be limited to a belt-driven alternator starter, as other types of drives could be used.

The battery systems described herein may be used to provide power to a number of different types of xEVs as well as other energy storage applications (e.g., electrical grid power storage systems). Such battery systems may include one or more battery modules, each battery module having a number of battery cells (e.g., lithium ion electrochemical cells) arranged to provide particular voltages and/or currents useful to power, for example, one or more components of an xEV. Presently disclosed embodiments include lithium ion battery modules that are capable of providing more than one voltage. In particular, certain disclosed battery systems may provide a first voltage (e.g., 12V), for example, to power ignition of a combustion engine using a traditional starter motor and/or support conventional 12V accessory loads, and may provide a second voltage (e.g., 48V), for example, to power a BAS and to power one or more vehicle accessories when the combustion engine is not running, for use in a micro-hybrid system for example. Indeed, in certain embodiments, not only may a single battery system provide two voltages (e.g., 12V and 48V), but it can provide them from a package having a form factor equivalent to a traditional lead acid 12V battery, thus making packaging and conversion of a traditional vehicle to a Micro-HEV simpler, less costly and more efficient.

Present embodiments also include physical battery module features, assembly components, manufacturing and assembling techniques, and so forth, that facilitate providing disclosed battery modules and systems that have a desired form factor (e.g., dimensions corresponding to a traditional lead acid battery). Further, as set forth in detail below, the disclosed battery module embodiments include a number of heat transfer devices (e.g., heat sinks, liquid-cooling blocks, heat transfer foams, phase change materials (PCMs), and so forth) that may be used to passively or actively maintain one or more temperatures of the battery module during operation.

With the foregoing in mind, FIG. 1 is a perspective view of an xEV 10 in the form of an automobile (e.g., a car) having a battery system 20 in accordance with present embodiments for providing all or a portion of the power (e.g., electrical power and/or motive power) for the vehicle 10, as described above. Although the xEV 10 may be any of the types of xEVs described above, by specific example, the xEV 10 may be a Micro-HEV, including an ICE equipped with a micro-hybrid system which includes a start-stop system that may utilize the battery system (energy storage system) 20 to power at least one or more accessories (e.g., AC, lights, consoles, etc.), as well as the ignition of the ICE, during start-stop cycles.

Further, although the xEV 10 is illustrated as a car in FIG. 1, the type of vehicle may differ in other embodiments, all of which are intended to fall within the scope of the present disclosure. For example, the xEV 10 may be representative of a vehicle including a truck, bus, industrial vehicle, motorcycle, recreational vehicle, boat, or any other type of vehicle that may benefit from the use of electric power. Additionally, while the battery system 20 is illustrated in FIG. 1 as being positioned in the trunk or rear of the vehicle, according to other embodiments, the location of the battery system 20 may differ. For example, the position of the battery system 20 may be selected based on the available space within a vehicle, the desired weight balance of the vehicle, the location of other components used with the battery system 20 (e.g., battery management systems, vents or cooling devices, etc.), and a variety of other considerations.

Figure 2:
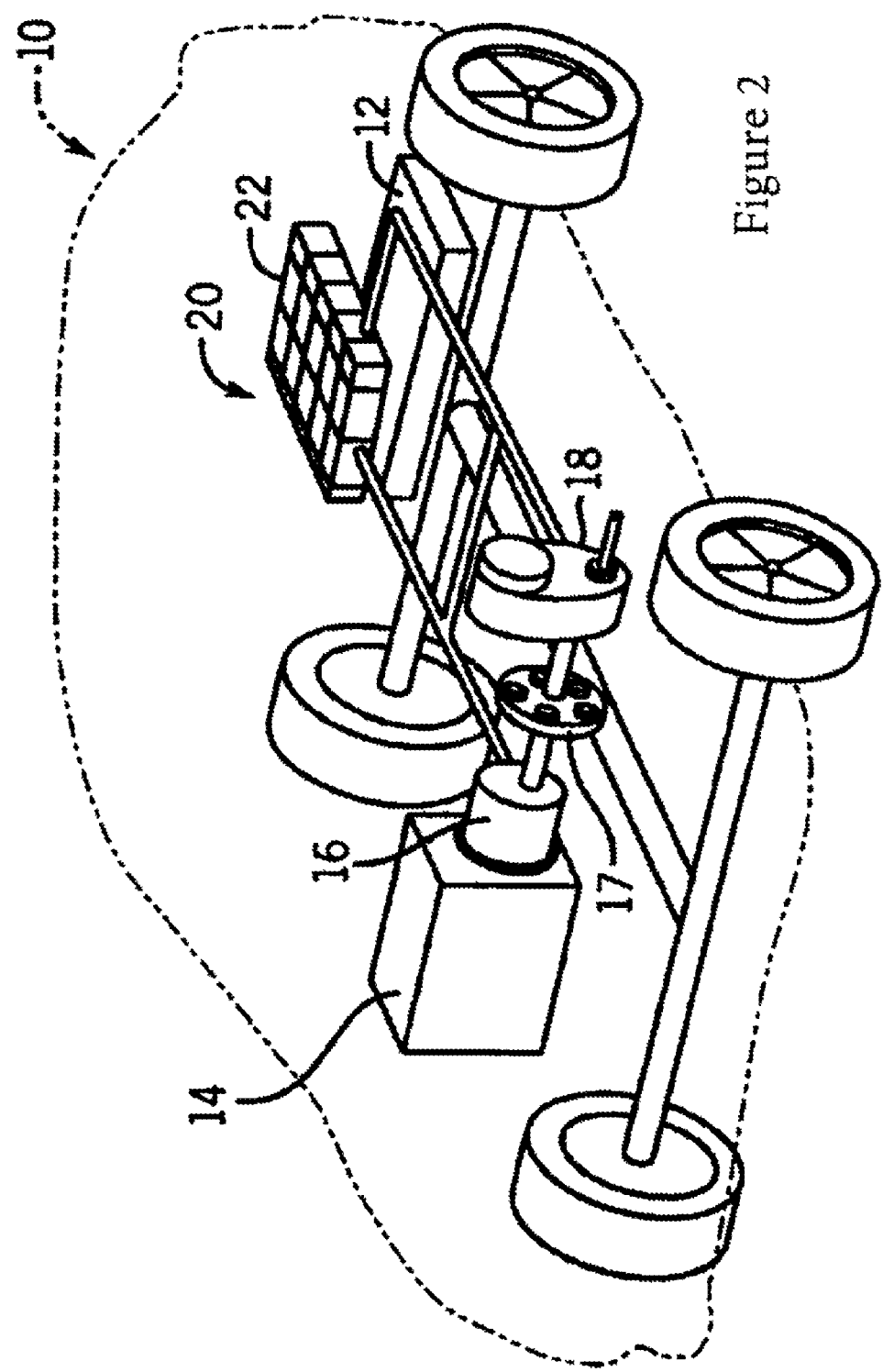
FIG. 2 is a cutaway schematic view of the xEV embodiment of FIG. 1 in the form of a hybrid electric vehicle (HEV), in accordance with an embodiment of the present approach.

FIG. 2 illustrates a cutaway schematic view of an embodiment of the xEV 10 of FIG. 1, provided in the form of an HEV having the battery system 20, which includes one or more battery modules 22. In particular, the battery system 20 illustrated in FIG. 2 is disposed toward the rear of the vehicle 10 proximate a fuel tank 12. In other embodiments, the battery system 20 may be provided immediately adjacent the fuel tank 12, provided in a separate compartment in the rear of the vehicle 10 (e.g., a trunk), or provided in another suitable location in the xEV 10. Further, as illustrated in FIG. 2, an ICE 14 may be provided for times when the xEV 10 utilizes gasoline power to propel the vehicle 10. The vehicle 10 also includes an electric motor 16, a power split device 17, and a generator 18 as part of the drive system.

The xEV vehicle 10 illustrated in FIG. 2 may be powered or driven by the battery system 20 alone, by the combustion engine 14 alone, or by both the battery system 20 and the engine 14. It should be noted that, in other embodiments of the present approach, other types of vehicles and configurations for the vehicle drive system may be utilized, and that the schematic illustration of FIG. 2 should not be considered to limit the scope of the subject matter described in the present application. According to various embodiments, the size, shape, and location of the battery system 20, the type of vehicle, the type of xEV technology, and the battery chemistry, among other features, may differ from those shown or described.

The battery system 20 may generally include one or more battery modules 22, each having a plurality of battery cells (e.g., lithium ion electrochemical cells), which are discussed in greater detail below. The battery system 20 may include features or components for connecting the multiple battery modules 22 to each other and/or to other components of the vehicle electrical system. For example, the battery system 20 may include features that are responsible for monitoring and controlling the electrical and thermal performance of the one or more battery modules 22.

Figure 3:
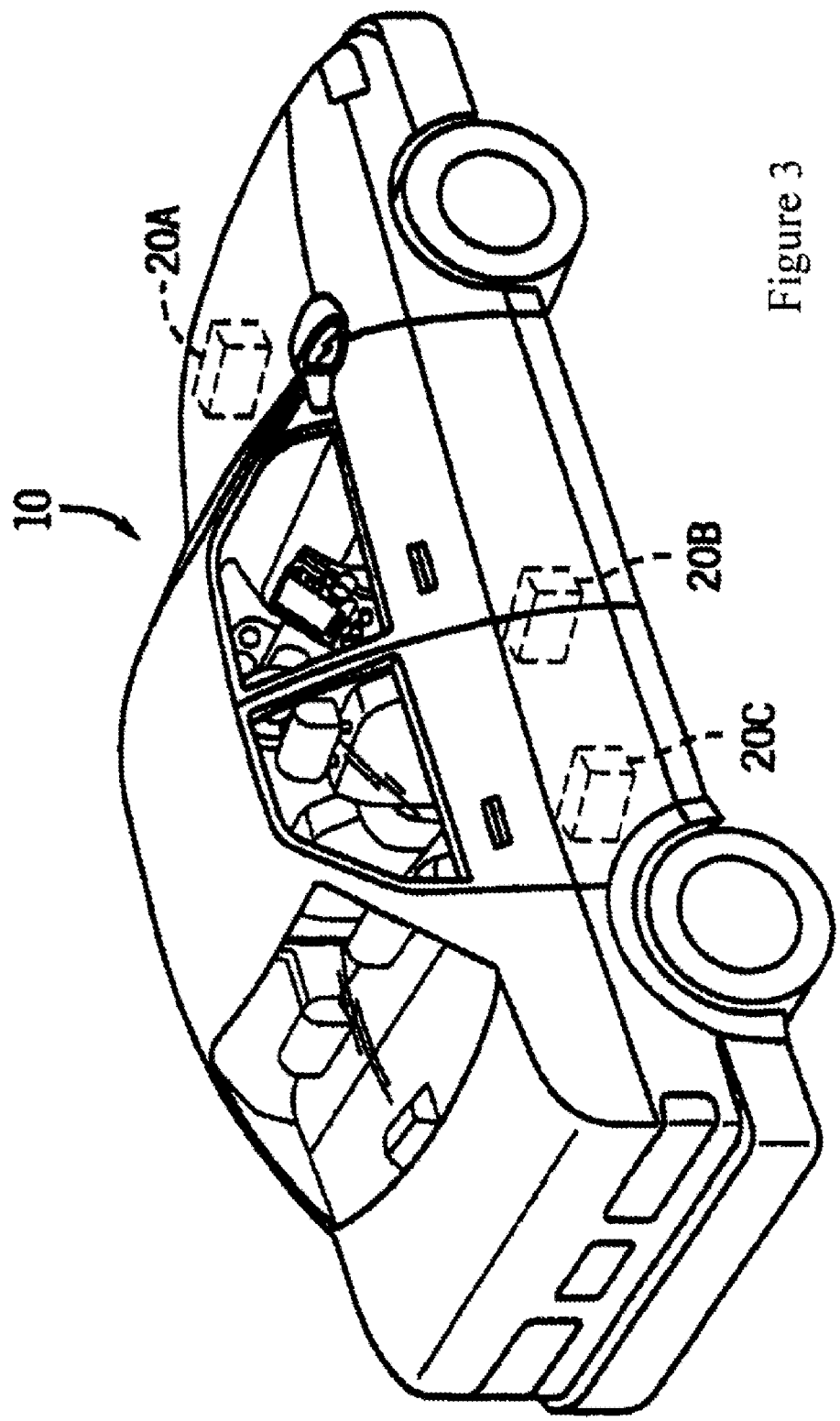
FIG. 3 is a cutaway schematic view of an embodiment of the xEV of FIG. 1 in the form of a micro-hybrid electric vehicle (Micro-HEV), in accordance with an embodiment of the present approach.

FIG. 3 illustrates a cutaway schematic view of another embodiment of the xEV 10 of FIG. 1, provided in the form of a Micro-HEV 10 having the battery system 20. As discussed above, the battery system 20 for use with a micro-hybrid system of an Micro-HEV 10 may include a single battery that provides a first voltage (e.g. 12V) and a second voltage (e.g. 48V) and that is substantially equivalent in size to a traditional 12V lead acid battery used in traditional ICEs. Hence, such a battery system 20 may be placed in a location in the Micro-HEV 10 that would have housed the traditional battery prior to conversion to a Micro-HEV. For example, as illustrated in FIG. 3, the Micro-HEV 10 may include the battery system 20A positioned similarly to a lead-acid battery of a typical combustion-engine vehicle (e.g., under the hood of the vehicle 10). By further example, in certain embodiments, the Micro-HEV 10 may include the battery system 20B positioned near a center of mass of the Micro-HEV 10, such as below the driver or passenger seat. By still further example, in certain embodiments, the Micro-HEV 10 may include the battery system 20C positioned below the rear passenger seat or near the trunk of the vehicle. It should be appreciated that, in certain embodiments, positioning a battery system 20 (e.g., battery system 20B or 20C) in or about the interior of the vehicle may enable the use of air from the interior of the vehicle to cool the battery system 20 (e.g., using a heat sink or a forced-air cooling design, as set forth in detail below).

Figure 4:
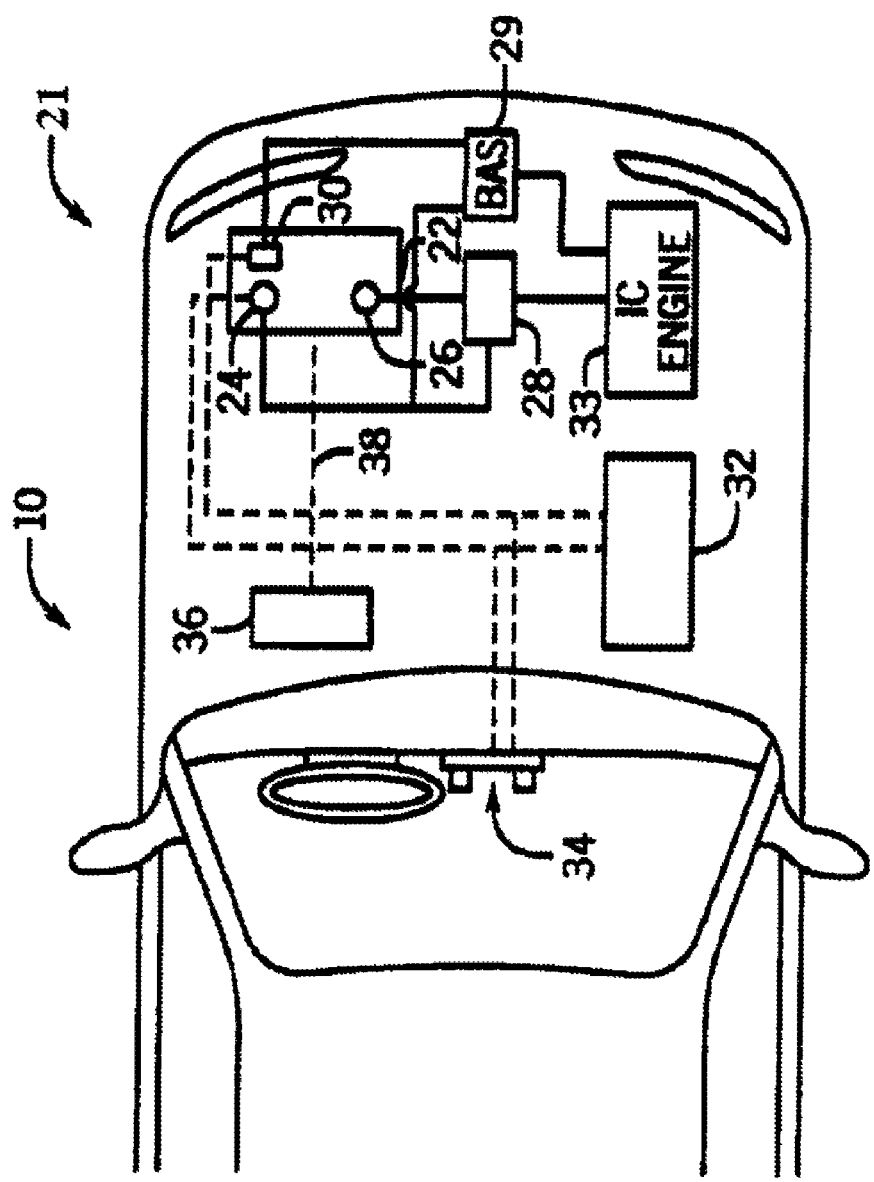
FIG. 4 is a schematic view of the Micro-HEV embodiment of FIG. 3 illustrating power distribution throughout the Micro-HEV, in accordance with an embodiment of the present approach.

FIG. 4 is a schematic view of an embodiment of the Micro-HEV 10 of FIG. 3 having an embodiment of an energy system 21 disposed under the hood of the vehicle 10 and includes battery system 20. As previously noted and as discussed in detail below, the battery system 20 may further have dimensions comparable to those of a typical lead-acid battery to limit or eliminate modifications to the Micro-HEV 10 design to accommodate the battery system 20. Further, the battery system 20 illustrated in FIG. 4 is a three-terminal battery that is capable of providing two different output voltages. For example, a first terminal 24 may provide a ground connection, a second terminal 26 may provide a 12V output, and a third terminal 30 may provide a 48V output. As illustrated, the 48V output of the battery module 22 may be coupled to a BAS 29, which may be used to start the ICE 33 during start-stop cycle, and the 12 V output of the battery module 22 may be coupled to a traditional ignition system (e.g., starter motor 28) to start the ICE 33 during instances when the BAS 29 is not used to do so. It should also be understood that the BAS 29 may also capture energy from a regenerative braking system or the like (not shown) to recharge the battery module 22.

It should be appreciated that the 48 V and 12 V outputs of the battery module 22 may also be provided to other components of the Micro-HEV 10. Examples of components that may utilize the 48 V output in accordance with present embodiments include radiator cooling fans, climate control fans, electric power steering systems, active suspension systems, electric air-conditioning systems, auto park systems, cooled seats, electric oil pumps, electric super/turbochargers, electric water pumps, heated seats, heated windscreen/defrosters, and engine ignitions. Examples of components that may utilize the 12 V output in accordance with present embodiments include window lift motors, vanity lights, tire pressure monitoring systems, sunroof motor controls, power seats, alarm systems, infotainment online features, navigation features, lane departure warning systems, electric parking brakes, and external lights. The examples set forth above are not exhaustive and there may be overlap between the listed examples. Indeed, for example, in some embodiments, features listed above as being associated with a 48 V load may utilize the 12 V output instead and vice versa.

In the illustrated embodiment, the 48 V output of the battery module 22 may be used to power one or more accessories of the Micro-HEV 10. For example, as illustrated in FIG. 4, the 48 V output of the battery module 22 may be coupled to the heating, ventilation, and air conditioning (HVAC) system 32 (e.g., including compressors, heating coils, fans, pumps, and so forth) of the Micro-HEV 10 to enable the driver to control the temperature of the interior of the Micro-HEV 10 during operation of the vehicle. This is particularly important in a Micro-HEV 10 during idle periods when the ICE 33 is stopped and, thus, not providing any electrical power via engine charging. As also illustrated in FIG. 4, the 48 V output of the battery module 22 may be coupled to the vehicle console 34, which may include entertainment systems (e.g., radio, CD/DVD players, viewing screens, etc.), warning lights and indicators, controls for operating the Micro-HEV 10, and so forth. Hence, it should be appreciated that the 48 V output may, in certain situations, provide a more efficient voltage at which to operate the accessories of the Micro-HEV 10 (e.g., compared to 12 V), especially when the ICE 33 is stopped (e.g., during start-stop cycles). It should also be appreciated that, in certain embodiments, the 48 V output of the battery module 22 may also be provided to any other suitable components and/or accessories (e.g., lights, switches, door locks, window motors, windshield wipers, and so forth) of the Micro-HEV 10.

Also, the Micro-HEV 10 illustrated in FIG. 4 includes a vehicle control unit/module (VCM) 36 that may control one or more operational parameters of the various components of the vehicle 10, and the VCM 36 may include at least one memory and at least one processor programmed to perform such tasks. Like other components of the Micro-HEV 10, the battery module 22 may be coupled to the VCM 36 via one or more communication lines 38, such that the VCM 36 may receive input from the battery module 22, and more specifically, the battery control module (BCM) of the battery module 22 (discussed in detail below). For example, the VCM 36 may receive input from the battery module 22 regarding various parameters, such as state of charge and temperature, and the VCM 36 may use these inputs to determine when to charge and/or discharge the battery module 22, when to discontinue charging the battery module 22, when to start and stop the ICE 33 of the Micro-HEV 10, whether to use the BAS 29 or the starter 28, and so forth.

In accordance with the present disclosure, the energy system 21 includes an energy storage system (ESS) having two voltage levels, such as 48V and 12V, or having a dual-voltage device, or having multiple storage devices at approximately the same voltage, for the application in HEVs, mHEVs, MHEVs, and PHEVs. In one embodiment, the ESS includes two energy storage devices, a power flow regulation (regulating) device and a control logic unit to control the regulation device. Examples of dual energy storage devices can be a combination between lithium ion batteries, lead acid batteries, nickel metal hybrid batteries, nickel zinc batteries, capacitors, and so on. One purpose of combining different types of energy storage devices can be to improve the cycle life, power characteristics, and operating efficiency of the ESS. Such hybrid ESS can utilize a high power storage device like an ultracapacitor and a high energy device like a lead-acid battery.

In one embodiment, one of the dual energy storage devices is configured to function as a high energy storage device in the ESS, while the other device may function as a high power storage device in the ESS. The regulation device is configured to regulate the power flow between at least the two energy storage devices. In doing so, the regulation device can control the voltages (i.e., enabling the dual energy storage devices to have different voltages), thereby allowing current flows to match power demands. The regulation device can also control the current flows, thereby allowing voltages to match power demand. Alternatively, the regulation device can mix the controlling of both the voltages and current flows.

The regulation device, which can be a DC/DC converting unit (converter) or any other similar device, is controlled by the control logic unit which makes control decisions for the power sharing between the two energy storage devices and for a power split between the motor/engine and battery for active boost and regeneration events. The regulation device may be a Buck converter, a Boost converter, a Buck-Boost converter, a single-ended primary-inductor converter (SEPIC), a CUK converter, or another type of convertor or regulator (all not shown).

Figure 5:
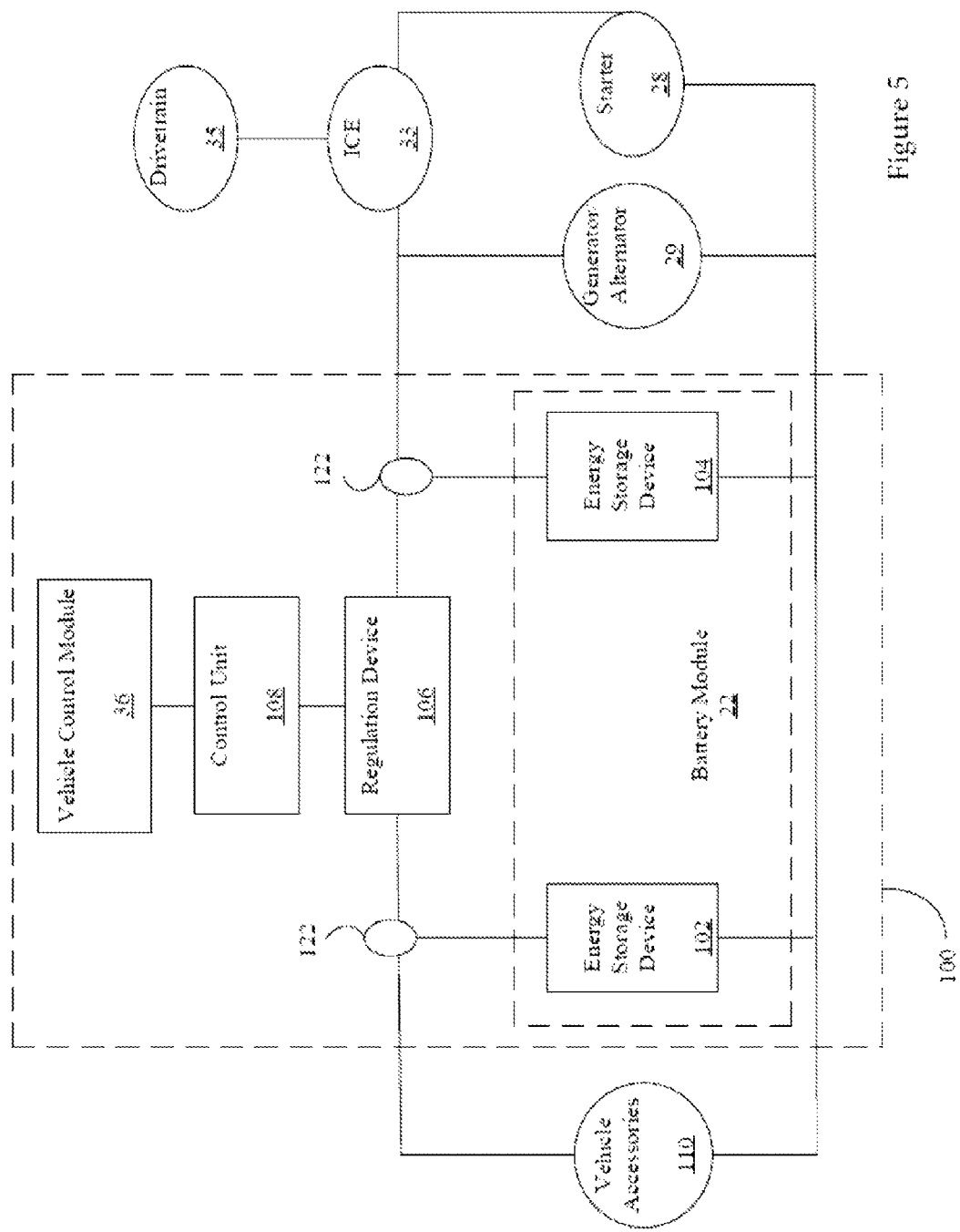
FIG. 5 is a schematic block diagram illustrating an embodiment of a dual energy storage system for hybrid vehicles.

An exemplary embodiment of an energy storage system (ESS) includes dual energy storage devices and is configured for the application in a micro hybrid vehicle, which has functions such as start stop, regeneration braking, and passive boost. As shown in FIG. 5, an ESS 100 includes battery module 22 that in turn includes a couple of (dual) energy storage devices (E1) 102 and (E2) 104, a voltage/current/energy flow regulating (regulation) device 106 that regulates the flow of electricity between two or more devices, a control logic unit 108, and VCM 36. As shown, energy storage device 102 is connected to electrical accessories 110, and energy storage device 104 is connected to a starter unit 28 and a generator/alternator unit 29. Alternatively, starter unit 28 and a generator/alternator unit 29 can be combined into an integrated starter-generator that provides both starter and generator functions. Further, energy system 21 may include an electro-mechanical motor (not shown), and/or a device that may be a combination of one or more of a generator, an alternator, a starter, and an electro-mechanical motor.

As shown, starter unit 28 is coupled to ICE 33, which is in turn coupled to generator/alternator 29 and to a drive train 35. Alternatively, electrical accessories 110 may be positioned between energy storage device 102 and regulation device 106. Moreover, electrical accessories 110 and/or energy storage device 102 may be positioned on opposite sides of regulation device 106. These different positions of energy storage device 102 within ESS 100 can support different voltages of energy storage device 102 to meet different power requirements of electrical accessories 110. In addition, based on power demands of generator/alternator unit 29, both storage devices 102 and 104 can be connected to generator/motor unit 29, and their respective power flows can be controlled individually by regulation device 106. In one embodiment, energy storage device 102, 104, or both may have a low resistance to render it suitable for high current operation under high power conditions, such as during starting and regenerating events.

In one embodiment, energy storage devices 102 and 104 can both be located on one side of regulation device 106. That is, energy storage devices 102 and 104 may be located between electrical accessories 110 and regulation device 106 or between generator/alternator unit 29 and regulation device 106.

As discussed above, the proposed ESS, implementable in Micro-HEVs and Mild-HEVs, may be a dual voltage battery system configured to support high power loads and provide power redundancy. Using this proposed ESS, new features are implemented in micro and Mild-HEVs such as incorporating an approximately 8-12 kilo watts (KW) motor generator to capture regeneration, support engine re-start, and higher power demands. In one embodiment, a voltage bridging unit, such as regulation device 106, may couple a lower voltage (e.g. 12 volts) system to a higher voltage (e.g., 24 to 60 V) system. As discussed above, the lower voltage system may include interior and exterior lights, audio entertainment, electronic modules, and ignition of the Micro-HEV or Mild-HEV. As discussed above, the higher voltage system may include air conditioning system (i.e., A/C compressor), active chassis, regeneration, and propulsion. As such, as equipped Micro-HEV or a Mild-HEV acquire a potential to change electrical load management due to high power regeneration, as well as electrification of new loads.

Figure 6:
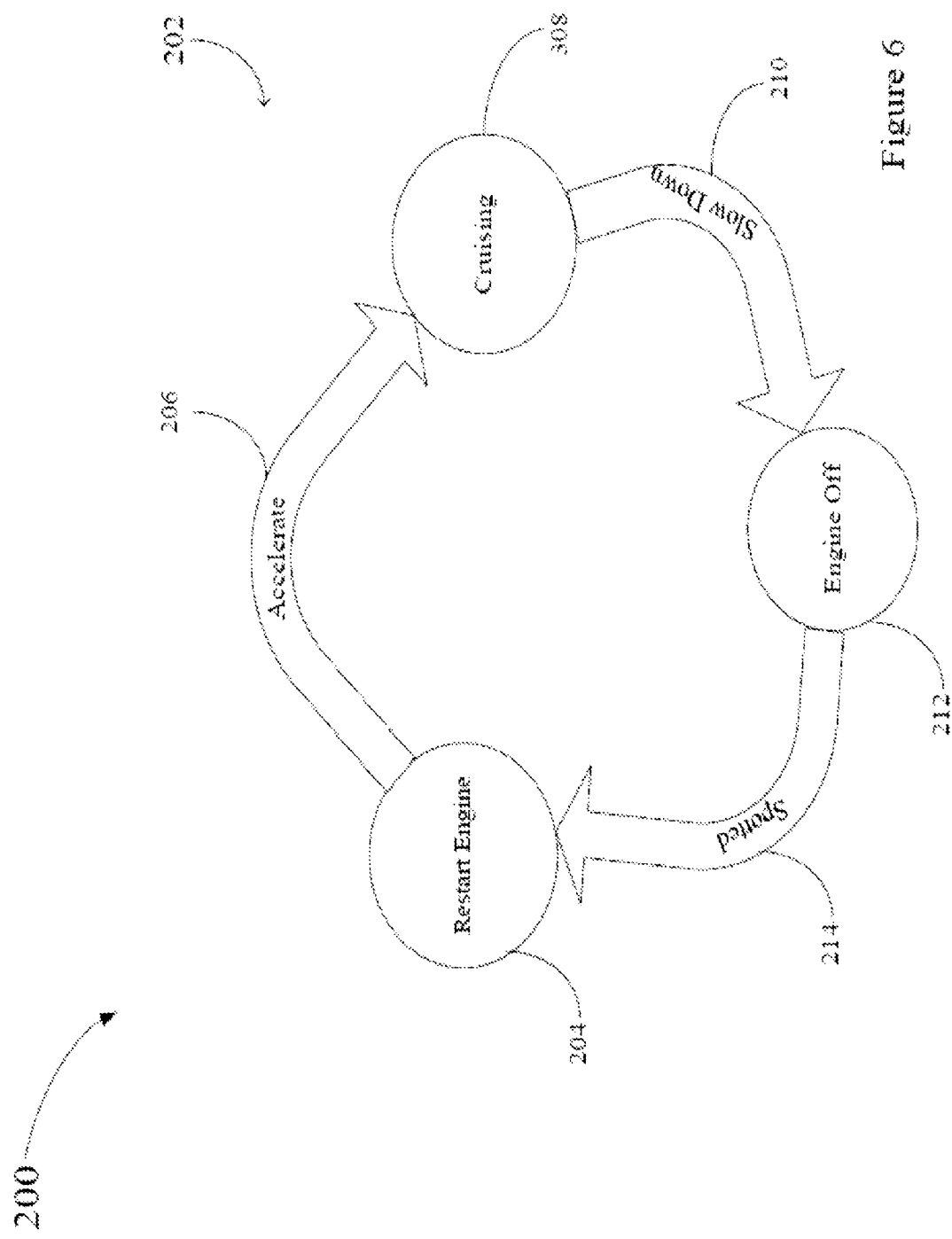
FIG. 6 is a block diagram illustrating an exemplary embodiment of a driving cycle as performed by a Micro-HEV or a Mild-HEV.

Now referring to FIG. 6, an exemplary embodiment 200 of a driving cycle 202 as performed by a Micro-HEV or a Mild-HEV is shown. Driving cycle 302 includes six operational modes, which are a restart engine mode 204, an acceleration mode 206, a cruising mode 208, a slow-down mode 210, an engine-off mode 212, and a stopped vehicle mode 214. Four of these operational vehicle modes 204-212 provide opportunities for ESS 100 to implement a fuzzy logic to optimize a management of the generated and stored energy. In one embodiment, during slowdown mode 210, ESS 100 is configured to capture braking energy through regeneration of electrical power to raise the state of charges (SOCs) of one or more of dual energy storage devices 102 and 104. During engine-off mode 212, ESS 100 is configured to support vehicle accessories, such as interior and exterior lights, infotainment, fans and blowers, and electronics to the extent possible based on the device SOCs. During acceleration mode 206, ESS 100 is configured to provide boosting power using belt-driven motor/generator/alternator 29. Engine-off mode 212 may be inhibited based on climate control demand, battery conditions, or other requirements. Because of the regenerating energy captured during a slowdown event (i.e., braking event), ESS 100 can be configured to enable activation of electric A/C.

Control logic unit 108 is configured to receive SOCs, voltage, current of energy storage device 102 and 104, vehicle operational mode, and optionally control input signals from VCM 36, and to allow ESS 100 to operate under multiple modes, by controlling regulation device 106. Further, control logic unit 108 can control regulation device 106 such that ESS 100 can provide maximum power on demand during regeneration and/or acceleration events, and provide voltage stability for loads associated with vehicle electrical accessories. Additionally, ESS 100 includes voltage and current sensing devices 118 configured for sensing signals of currents flowing to/from energy storage devices 102 and 104 and signals of voltages across energy storage devices 102 and 104, and any other suitable sensing devices. Further, ESS 100 can include switching units (not shown) that can serve to disconnect/decouple or connect/couple the above cited elements from one another.

Examples of dual energy storage devices 102 and 104 can be a combination of lead acid batteries, nickel metal hybrid batteries, lithium ion batteries, advanced lithium batteries, capacitors and the like. In one embodiment, energy storage device 104 can function as an energy carrier in ESS 100, while energy storage device 102 can function as a high power component for better charge acceptance in ESS 100. As stated above, regulation device 106 can be a DC/DC converter device, which can be configured to allow energy storage devices 102 and 104 to have different voltages and to regulate the current and power flow between them. As such, regulation device 106 can provide a seamless permanent interface between energy storage devices 102 and 104 and can adapt to voltage differences between them and can provide bidirectional operations at different voltage ranges. In one embodiment, a voltage across energy vehicle accessories 110 (or power network associated with energy storage device 102) can be about twelve (12) volts, and a voltage across generator/alternator unit 29 and starter unit 28 (or power network associated with energy storage device 104) can be between 12 and sixty (60) volts. Alternatively, any other suitable voltage values may be applied to vehicle accessories 110 and generator/alternator unit 29.

Additionally, under control inputs from control logic unit 108, regulation device 106 can couple/decouple energy storage devices 102 and 104 to/from one another based on various operation modes of the vehicle. The combination of control logic unit 108 and regulation unit 106 allows for optimization of the overall energy storage system 100, allowing for an overall higher charge acceptance with smaller energy storage devices 102 and 104.

In one embodiment, generator/alternator 29 is configured to ICE 33 and generate electrical power for the vehicle once ICE 33 is in running mode. Starter unit 28 is configured to transfer electrical energy (power) to energy storage device 104 and/or energy storage device 102 to charge them after ICE 33 has been started and for capturing electrical power from the vehicle such as from regenerative braking. As stated above, energy storage device 102 is connected to electrical accessories 110 and energy storage device 104 is connected to starter unit 28 and generator/alternator 29. As such, even when ICE 33 is not in running mode energy storage device 102 can supply power to electrical accessories 110. Further, regulation device 106 can transfer energy between energy storage devices 102 and 104 based on control signals received from control logic unit 108. In this case, the control signals are determined based on vehicle operating modes and/or internal battery information, including one or more of the respective state of charge values (hereafter referred to as SOC), impedances, or temperatures (among other data) of energy storage devices 102 and 104.

In addition to providing voltage, current and operation mode signals to control logic unit 108, VCM 36 communicate signals indicative of the motion state of the vehicle, such as driven, stopped, parked, etc. . . . Further, control logic unit 108 is configured to provide information regarding SOC and other states of energy storage devices 102 and 104, as well as operating states of starter unit 28, generator/alternator unit 29, ICE 33, regulation device 106, and vehicle accessories 110.

In one exemplary embodiment, control logic unit 108 is configured to perform as a fuzzy logic controlling unit. The corresponding fuzzy logic controlling process is implemented as a computer-implemented control algorithm or method that is based on a fuzzy derivation of logical decisions/outputs from inputs received from VCM 36 and/or regulation device 106. The fuzzy logic control is configured to be dynamically adjustable, to incorporate a control approach derived from prior performances of ESS 100, and to optionally combine the fuzzy logic with conventional control techniques. Further, control logic unit 108 is configured to control regulation device 106 in order to optimize energy storage devices 102 and 104 against any objective criterion (such as vehicle fuel economy), and to control their respective longevity by managing their degradation during challenging or extreme operating conditions.

In one embodiment, the fuzzy logic controlling process may combine fuzzy logic with other machine learning algorithms, thereby combining the human-like approach of fuzzy logic with a supervised and unsupervised learning strategy (algorithm) based on training Examples of supervised algorithms may include artificial neural networks (ANNs), discriminant methods, nearest neighbor methods, support vector machines (SVM), genetic algorithms, Bayesian algorithms, or others. The supervised learning strategy can be established based on data collected from a performance of ESS 100 during a number of varying driving events and during simulations of different driving cycles.

Regarding control techniques, depending on the power capabilities of energy storage devices 102 and 104, regulation device 106 may enable the following operating states of energy storage devices 102 and 104. These modes may be implemented through one or more current or voltage regulation techniques. An exemplary technique is a pulse-width modulation.

Exemplary control techniques include:
1. Both energy storage devices 102 and 104 operate at their maximum power capability, such that the power capability of the ESS 100 operates at its maximum.
2. Energy storage device 104 can operate at its maximum power capability, while energy storage device 102 can operates at fraction of its maximum power capability.
3. Energy storage device 102 can operate at its maximum power capability, while energy storage device 104 can operates at fraction of its maximum power capability.
4. Energy storage device 104 can provide full power requirement, while energy storage device 102 is in an open circuit state.
5. Energy storage device 102 can provide full power requirement, while energy storage device 104 is in an open circuit state.
6. Energy storage device 102 can provide full power requirement, while energy storage device 104 is in a charge mode.
7. Energy storage device 104 can provide full power requirement, while energy storage device 102 is in a charge mode.
8. Both energy storage devices 102 and 104 operate at fractions of their maximum power capabilities.

Moreover, to optimize a distribution of power to both energy storage devices 102 and 104 during regeneration events, the fuzzy logic control can utilize a detailed model of energy storage devices 102 and 104, which includes variables like terminal voltages, SOCs, internal resistances, thermal aspects, and modeling of energy storage deterioration. Additionally, external data, whether communicated from the vehicle or from other sources, may optionally be used if available.

Figure 7:
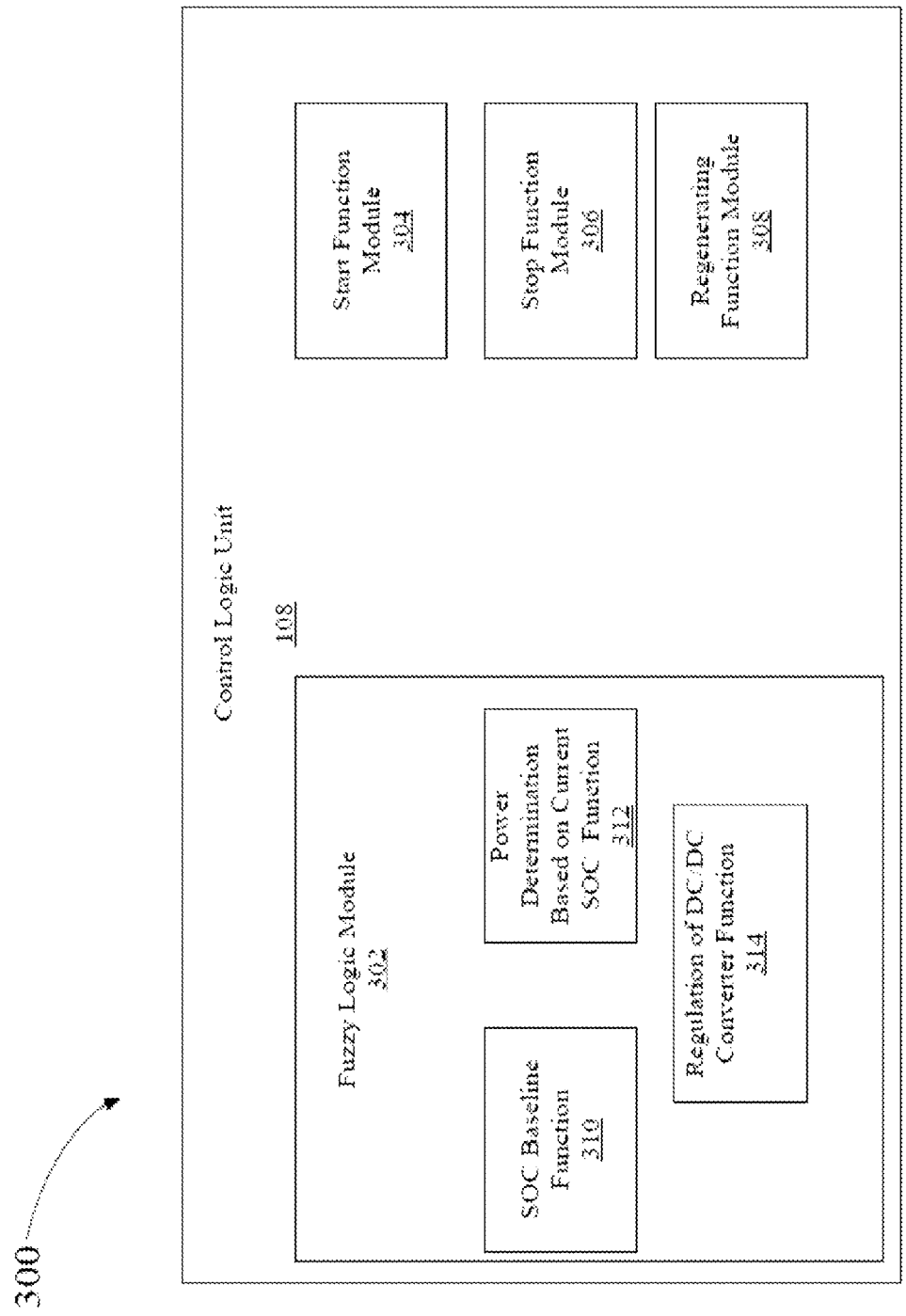
FIG. 7 is a block diagram illustrating an exemplary embodiment of a control logic unit of the dual energy storage system of FIG. 5.

Now referring to FIG. 7, in one exemplary embodiment, control logic unit 108 includes a fuzzy logic module or program 302, a start function module 304, a stop function module 306, and a regenerating function module 308. Fuzzy logic module 302 includes a target SOC and current SOC function or program 310, an available power determination function 312 based on target SOC and current SOC of energy storage devices 102 and 104, and a regulation/operation function 314 of regulation device 106, which is configured to determine a power flow between energy devices 102 and 104.

In accordance with one embodiment, based on the input signals received from VCM 36, control logic unit 108 is configured to generate output signals corresponding to decisions regarding the voltage, current, and/or power output setpoints of regulation device 106. Additionally, control logic unit 108 may control the on/off switching behavior of regulation device 106, including any modulation characteristics (such as power-on setpoint, duty cycle, and frequency) used by PWM or any other modulation scheme. Control logic unit 108 is further configured to determine the regeneration power that goes into energy storage devices 102 and 104 for regeneration event and propulsion power for active boosting from generator/alternator 29. The input signals provided to control logic unit 108 may include, but are not limited to, voltages of and currents flowing through energy storage devices 102 and 104, SOC of energy storage devices 102 and 104, the vehicle operation mode, the generator control command etc. As stated above, the input signals to control logic unit 108 may include signals from VCM 36. As such, control logic unit 108 further uses a fuzzy logic approach to determine an operation of regulation device 106 based on received input signals. Thus, control logic unit 108 can include, but does not require, an interface to connect to a vehicle communication network, which will be described in further detail hereafter.

As discussed above, control logic unit 108 is configured to determine, using fuzzy logic, a target SOC of each of energy storage devices 102 and 104. In one embodiment, using fuzzy logic, the target SOC is determined based on a driving condition of the vehicle. For example, when the vehicle speed is above a predetermined speed threshold, a value of the target SOC can be kept low to provide charging room for an eventual regeneration event. When the vehicle is driven at a high speed, less power is required and one of energy storage devices 102 and 104 may meet the whole power demand based on its SOC. Whereas, during a start-up or an acceleration event of the vehicle, more power is required and both energy storage devices 102 and 104 may be needed to provide the required power. When the vehicle is slowing down (i.e., decelerating), the regenerating braking power may be used to provide energy to at least one of energy storage devices 102 and 104. Thus, the SOC of each one of energy storage devices 102 and 104 may be manipulated by considering the vehicle conditions, such as vehicle speed. The SOC of at least one of energy storage devices 102 and 104 can be lowered in advance so as to receive more recuperative energy when regenerative power can be predicted or is expected. Similarly, the SOC of at least one of energy storage devices 102 and 104 can be kept high or raised when engine restarting or power boosting can be predicted in advance so as to charge the batteries to a higher degree (preferably by recuperative energy) when discharge power is expected.

As regeneration events cannot be exactly predicted, the fuzzy logic may be provided route data that includes anticipatable deceleration events, such as obligatory vehicle stops at stop signs and potential stops at stop lights associated with a driving route selected by the driver of the vehicle. Moreover, the route data may be enhanced by dynamically updating a status of the traffic on the driving route. As such, in addition to being adaptive to the operations modes of the vehicle, the fuzzy logic can also be predictive based on the anticipated conditions of the selected driving route. Accordingly, a transition between different operating states of energy storage devices 102 and 104 can be initiated based on their respective SOCs, the vehicle speed, energy demand from vehicle accessories, and anticipated driving conditions.

In one embodiment, input signals received by control logic unit 108 include internal signals that relate to current, voltage, temperature, state of charge, state of health of energy storage devices 102 and 104, operating status of regulation device 106, and signals provided externally to ESS 100, such as signals communicated through a vehicle communication network.

In another embodiment, using fuzzy logic, control logic unit 108 is configured to determine a difference or deviation between a current SOC of energy storage devices 102 and 104 and their respective target SOC, to use the difference/deviation to determine dynamically an amount of power that is available for active boosting.

As stated above, based on input signals received from VCM 36, control logic unit 108 is configured to implement the start, stop, and regenerating functions by providing corresponding signals to regulation device 106, energy storage devices 102 and 104, starter unit 28, and generator/alternator unit 29. As stated above, the start-function signal corresponds to a vehicle state in which ICE 33 is being started. The stop-function signal corresponds to a complete stop state of the vehicle. The regenerating function signal corresponds to a vehicle state in which electrical energy is generated and stored while performing a vehicle braking event. As such, generator/alternator unit 29 can generate electrical energy during the braking event to be stored in energy storage device 104 and/or energy storage device 102 depending on their respective SOCs. Both energy storage devices 102 and 104 have upper and lower limits or thresholds for their respective SOCs. For example, energy storage device 102 has preset or predetermined upper (maximum) and lower (minimum) threshold values SOC1_max and SOC1_min, respectively. Similarly, energy storage device 104 has predetermined maximum and minimum threshold values SOC2_max and SOC2_min, respectively.

Figure 8:
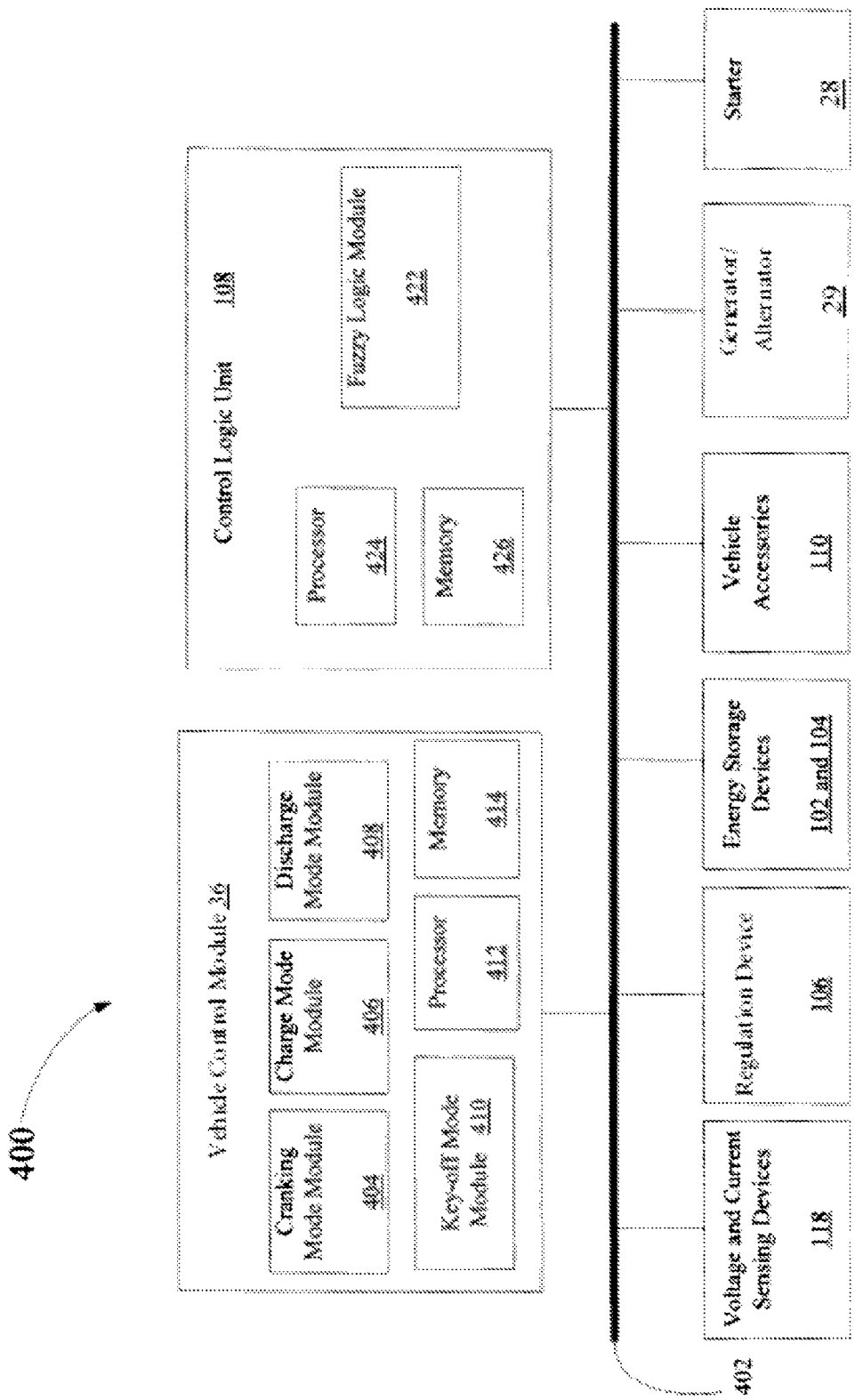
FIG. 8 is a schematic block diagram illustrating a communication circuit coupling the various components/devices of the dual energy storage system of FIG. 5.

Now referring to FIG. 8, an exemplary embodiment of a communication circuit 400 coupling the various components/devices of ESS 100 is shown. As shown, VCM 36 is connected to a communication bus 402 to which are connected control logic unit 108, regulation device 106, energy storage devices 102 and 104, vehicle accessories 110, and sensing devices 118. As stated above, the modes of operation of the vehicle are determined by VCM 36. As such, to implement the corresponding operation schemes of ESS 100, control logic unit 108 receives via communication bus 402 suitable input signals from VCM 36 and current SOC signals from energy storage devices 102 and 104, and determines output of the fuzzy logic approach for a target SOC of energy storage devices 102 and 104 based on the vehicle's current speed, and uses another output of the fuzzy logic approach to control the regulation device 106 by pulse width modulation or otherwise to regulate the power flow between energy storage devices 102 and 104.

As shown in FIG. 8, VCM 36 includes a cranking mode module or program 404, a charge mode module 406, a discharge mode module 408, a key-off module 410, a processing unit 412, and a memory unit 414 coupled to processing unit 412. Further, as shown, control logic unit 108 includes a fuzzy logic module 422, a processing unit 424, and a memory unit 426 coupled to processing unit 424.

Each of processing units 412 and 424 can be implemented on a single-chip, multiple chips or multiple electrical components. For example, various architectures can be used including dedicated or embedded processor or microprocessor ($\mu P$), single purpose processor, controller or a microcontroller ($\mu C$), digital signal processor (DSP), field-programmable gate array (FPGA), or any combination thereof. In most cases, each of processing units 412 and 424 together with an operating system operates to execute computer code and produce and use data. Each of memory units 414 and 426 may be of any type of memory now known or later developed including but not limited to volatile memory (such as RAM), non-volatile memory (such as ROM, flash memory, etc.) or any combination thereof, which may store software that can be accessed and executed by processing units 412 and 424, respectively, for example.

Figure 9:
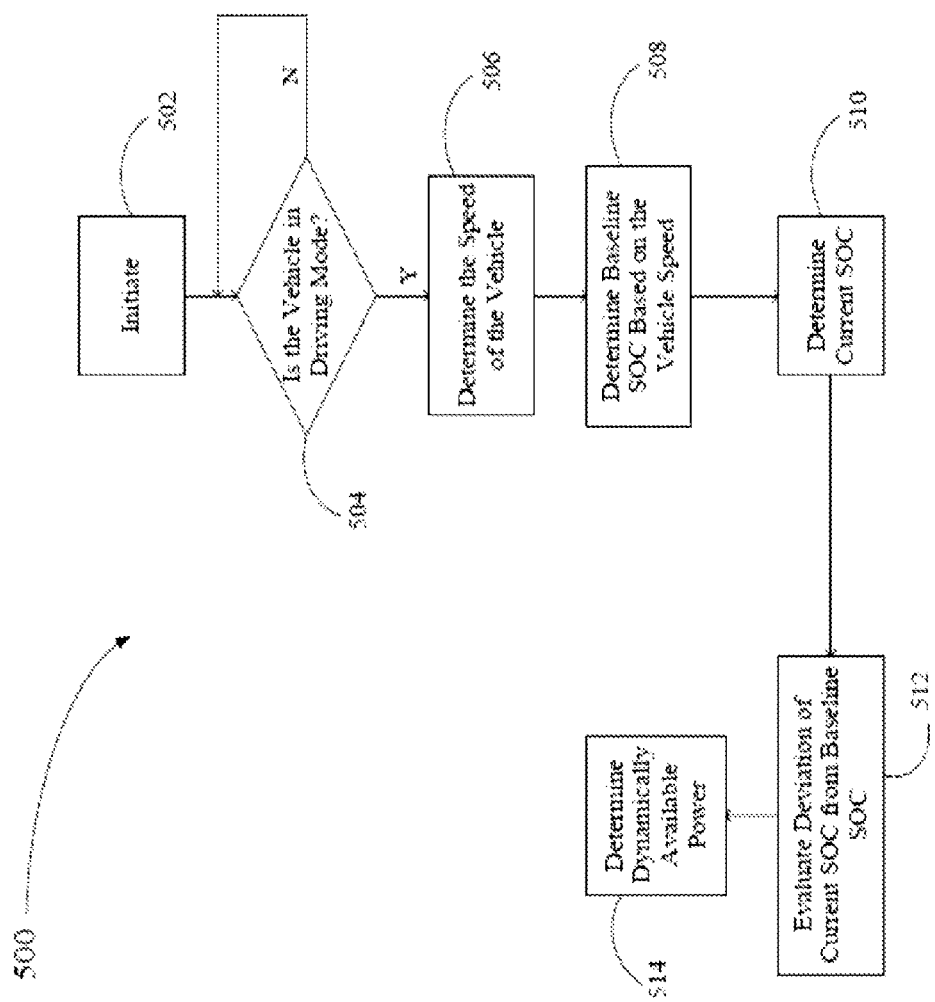
FIG. 9 is a flow chart illustrating an example embodiment of a method for controlling operation modes of the hybrid vehicle using fuzzy logic performed by a control unit.

Now referring to FIG. 9, a flow chart shows an exemplary method 500, initiated at Step 502, for implementing fuzzy logic approaches, determined by control unit 108, to manage the different operation schemes of ESS 100. At Step 504, control logic unit 108 is configured to determine whether the vehicle is in a driving mode based on instructive signals received from VCM 36 or other source of data. In the affirmative, control logic unit 108 determines a current speed of the vehicle, at Step 506. Based on the determined vehicle speed, control logic unit 108 is configured to dynamically determine a target SOC value of each one of energy storage devices 102 and 104, at Step 508. Based on data received from VCM 36 and/or from energy storage devices 102 and 104, control logic unit 108 is configured to determine a current SOC value of each one of energy storage devices 102 and 104, at Step 510. Then at Step 512, control logic unit 108 determines a deviation/difference between the determined target SOC value and the current SOC value. Based on the determined deviation, control logic unit 108 is configured to dynamically determine an amount of power/energy available for regeneration of energy storage devices 102 and 104, for electrical assistance of accessories 110, and for propulsion, at Step 514. Moreover, once the vehicle is no longer in driving mode, control logic unit 108 is configured to use fuzzy logic to regulate power flow between energy storage devices 102 and 104. This can be done via regulation device 106, using PWM or other means to control the power output.

Figure 10:
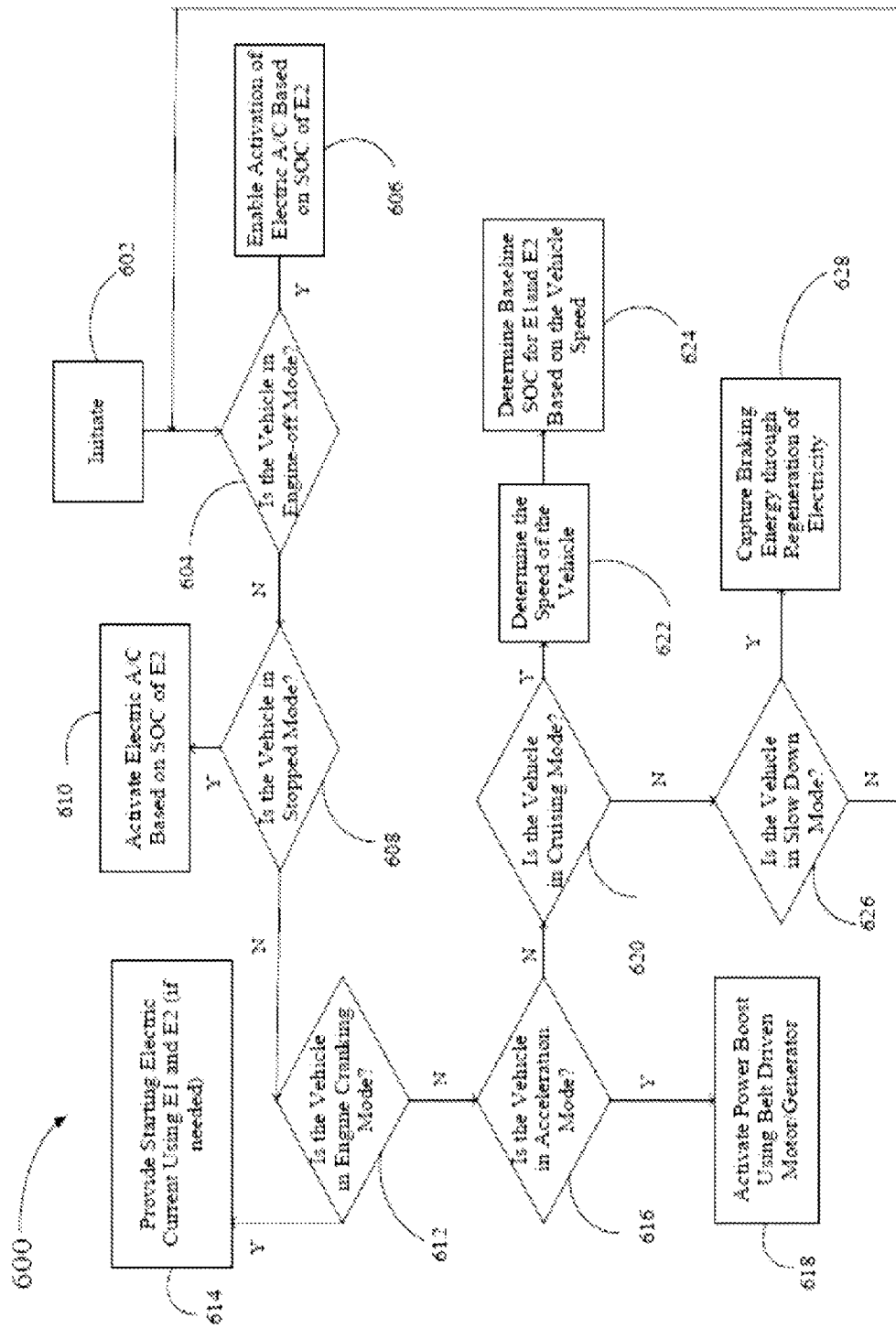
FIG. 10 is a flow chart illustrating an example embodiment of a method for implementing a fuzzy logic management of different operational modes of Micro-HEVs or a Mild-HEVs.

Now referring to FIG. 10, a flow chart shows an exemplary method 600, initiated at Step 602, for implementing a fuzzy logic management, determined by control unit 108, of the different operational modes of Micro-HEVs or Mild-HEVs. This exemplary method would be for use in a vehicle equipped with electric AC. Other conditions and vehicle configurations would result in different flow charts. At Step 604, control logic unit 108 is configured to determine whether the vehicle is in an engine-off mode based on instructive signals received from VCM 36. In the affirmative, control logic unit 108 determines whether a current level of SOC of energy storage device 104 is suitable to activate the vehicle's electric A/C, and proceeds with the activation when the determination is positive, at Step 606. Otherwise, control logic unit 108 is configured to determine whether the vehicle is in a stopped mode, at Step 608, and in the affirmative proceeds to activate the electric A/C of the vehicle, at Step 610. Otherwise, control logic unit 108 is configured to determine whether the vehicle is in an engine cranking mode, at Step 612, and in the affirmative proceeds to provide starting current using energy from energy storage device 102 and if needed from energy storage 104, at Step 614. Otherwise, control logic unit 108 is configured to determine whether the vehicle is in an acceleration mode, at Step 616, and in the affirmative proceeds to activate power boosting using belt driven generator/alternator 29, at Step 618. Otherwise, control logic unit 108 is configured to determine whether the vehicle is in a cruising mode, at Step 620, and in the affirmative proceeds to apply the fuzzy logic process of FIG. 9 starting at Steps 622 and 624. Otherwise, control logic unit 108 is configured to determine whether the vehicle is in a slowdown mode, at Step 626, and in the affirmative proceeds to capture through regeneration braking energy for storage in at least energy storage device 104, at Step 628.

Figure 11:
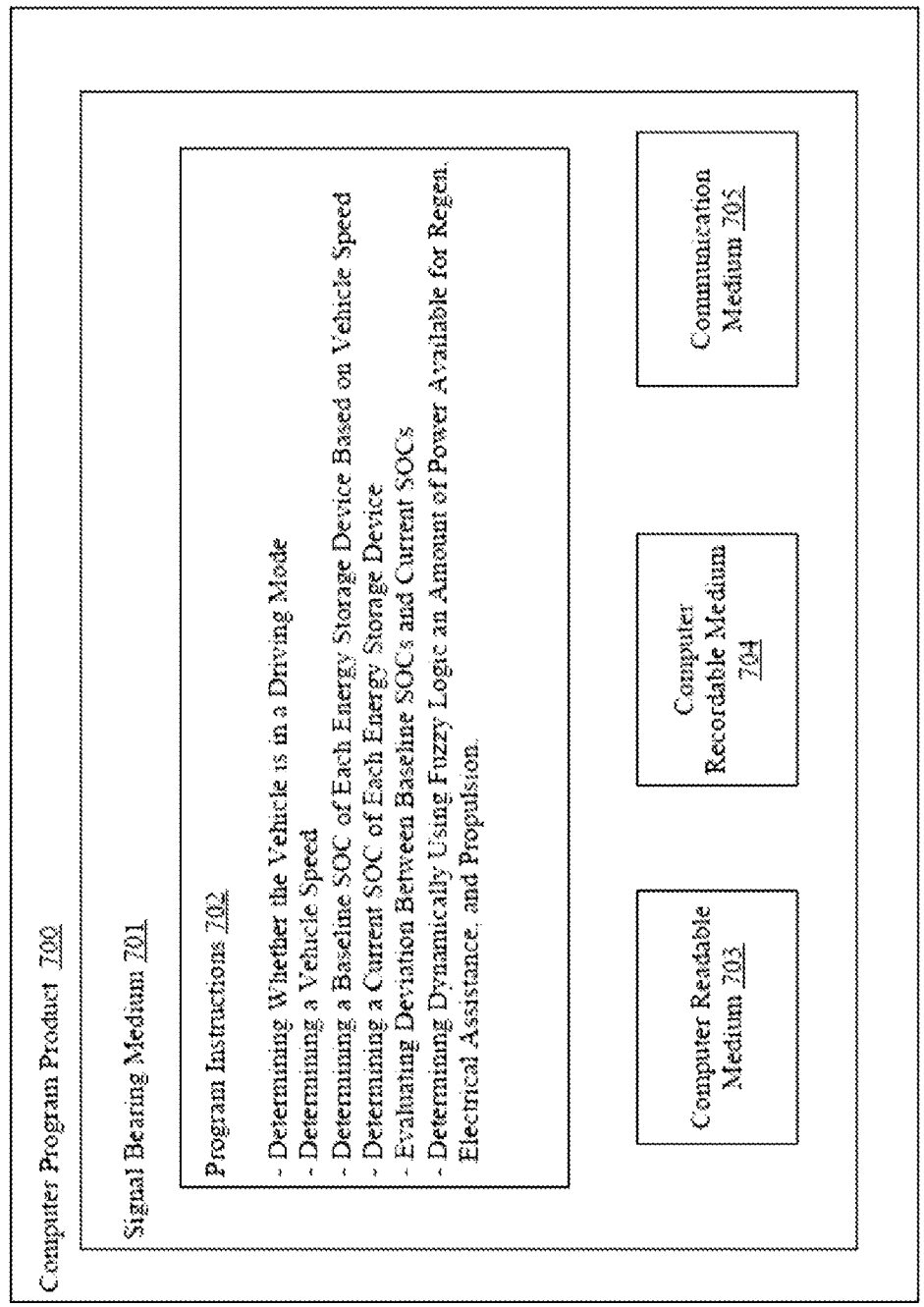
FIG. 11 is a schematic diagram illustrating a conceptual partial view of an example computer program product.

In some embodiments, the disclosed method, as well as alternate methods, may be implemented as computer program instructions encoded on a computer-readable storage media in a machine-readable format. FIG. 11 is a schematic illustrating a conceptual partial view of an example computer program product 700 that includes a computer program for executing a computer process on a computing device, arranged according to at least some embodiments presented herein. In one embodiment, the example computer program product 700 is provided using a signal bearing medium 701. The signal bearing medium 701 may include one or more programming instructions 702 that, when executed by a processing unit may provide functionality or portions of the functionality described above with respect to FIGS. 1-10. Thus, for example, referring to the embodiment shown in FIGS. 9 and 10, one or more features of blocks 504-514 and 604-634, may be undertaken by one or more instructions associated with the signal bearing medium 701.

In some examples, signal bearing medium 701 may encompass a non-transitory computer-readable medium 703, such as, but not limited to, a hard disk drive, memory, etc. In some implementations, the signal bearing medium 701 may encompass a computer recordable medium 704, such as, but not limited to, memory, read/write (R/W) CDs, R/W DVDs, etc. In some implementations, signal bearing medium 501 may encompass a communications medium 705, such as, but not limited to, a digital and/or an analog communication medium (e.g., a fiber optic cable, a waveguide, a wired communications link such as a controller area network or any suitable vehicle communication bus, etc.).

The logic control, as used herein, includes but is not limited to hardware, firmware, software in execution on a machine/device, and/or combinations of each to perform a function(s) or an action(s), and/or to cause a function or action from another logic control, method, and/or system. Logic control may include a software controlled microprocessor, a discrete logic (e.g., ASIC), an analog circuit, a digital circuit, a programmed logic device, a memory device containing instructions, and so on. Logic control may be implemented using one or more gates, combinations of gates, or other circuit components. Where multiple logic controls are described, it may be possible to incorporate them into one physical logic control. Similarly, where a single logic control is described, it may be possible to distribute it between multiple physical logic controls.

One or more of the disclosed embodiments, alone or in combination, may provide one or more technical effects useful in the fuzzy logic controlling for energy management in Micro-HEVs or Mild-HEVs. The technical effects and technical problems in the specification are exemplary and are not limiting. It should be noted that the embodiments described in the specification may have other technical effects and can solve other technical problems.

While only certain features and embodiments of the disclosure have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

What is claimed is:

1. A computer-implemented method for controlling an operation of an energy storage system of a micro-hybrid vehicle, the method comprising:
    determining, using a processor, a driving mode of the micro-hybrid vehicle, and determining a speed of the micro-hybrid vehicle when in the driving mode, wherein the driving mode comprises one of an engine-off mode, an acceleration mode, or a slow-down mode;

determining, using the processor, a target state of charge (SOC) of each of a first energy storage device and a second energy storage device based on the speed;

determining, using the processor, a current SOC of each of the first energy storage device and the second energy storage device;

determining, using the processor, an amount of power available from a regenerative event for:
regeneration of the first energy storage device;
regeneration of the second energy storage device;
electrical accessories associated with the micro-hybrid vehicle; and
a motor associated with the micro-hybrid vehicle, wherein the amount of power available from the regenerative event is determined based on a difference between the target SOC and the current SOC of each of the first energy storage device and the second energy storage device; and directing, using the processor, a power flow from the regenerative event to the first energy storage device, the second energy storage device, the electrical accessories associated with the micro-hybrid vehicle, and the motor associated with the micro-hybrid vehicle using a fuzzy logic and the amount of power available from the regenerative event, wherein the fuzzy logic is configured to cause the processor to:
activate at least one of the electrical accessories when the current SOC of the second energy storage device is suitable for the at least one of the electrical accessories and when the driving mode of the micro-hybrid vehicle corresponds to the engine-off mode;
activate power boosting for the motor when the driving mode of the micro-hybrid vehicle corresponds to the acceleration mode; and
direct braking energy to the second energy storage device when the driving mode of the micro-hybrid vehicle corresponds to the slow-down mode.

2. The computer-implemented method of claim 1, wherein the processor is configured to control a second power flow between the first and second energy storages devices based on the difference between the target SOC and the current SOC.

3. The computer-implemented method of claim 1, wherein the processor is configured to control the power flow using a modulation technique.

4. The computer-implemented method of claim 1, wherein the fuzzy logic is configured to cause the processor to direct the braking energy to the first energy storage device when the driving mode of the micro-hybrid vehicle corresponds to the slow-down mode.

5. The computer-implemented method of claim 4, wherein the fuzzy logic is configured to cause the processor to activate at least one of the electrical accessories when the current SOC of the second energy storage device is suitable for the at least one electrical accessories and when the driving mode of the micro-hybrid vehicle corresponds to a stopped mode.

6. The computer-implemented method of claim 5, wherein the fuzzy logic is configured to cause the processor to provide a starting electric current using energy from the first energy storage device when the driving mode of the micro-hybrid vehicle corresponds to an engine cranking mode.

7. The computer-implemented method of claim 6, wherein the fuzzy logic is configured to cause the processor to provide the starting electric current when the first energy storage device has sufficient energy to provide the starting electric current.

8. The computer-implemented method of claim 7, wherein the fuzzy logic is configured to cause the processor to provide the starting electric current using energy from the second energy storage device when the first energy storage device does not have sufficient energy to provide the starting electric current.

9. A computer-implemented method for controlling an operation of an energy storage system of a micro-hybrid vehicle, the method comprising:
determining, using a processor, a driving mode of the micro-hybrid vehicle, and determining a speed of the micro-hybrid vehicle when in the driving mode, wherein the driving mode comprises one of a stopped mode, an engine cranking mode, or a slow-down mode;

determining, using the processor, a target state of charge (SOC) of each of a first energy storage device and a second energy storage device based on the speed;

determining, using the processor, a current SOC of each of the first energy storage device and the second energy storage device;

determining, using the processor, an amount of power available from a regenerative event for:
regeneration of the first energy storage device;
regeneration of the second energy storage device;
electrical accessories associated with the micro-hybrid vehicle; and
a motor associated with the micro-hybrid vehicle, wherein the amount of power available from the regenerative event is determined based on a difference between the target SOC and the current SOC of each of the first energy storage device and the second energy storage device; and directing, using the processor, a power flow from the regenerative event to the first energy storage device, the second energy storage device, the electrical accessories associated with the micro-hybrid vehicle, and the motor associated with the micro-hybrid vehicle using a fuzzy logic and the amount of power available from the regenerative event, wherein the fuzzy logic is configured to cause the processor to:
activate at least one of the electrical accessories associated with the micro-hybrid vehicle when the driving mode corresponds to the stopped mode;
provide a starting electric current using energy from the first energy storage device when the driving mode of the vehicle corresponds to the engine cranking mode; and
direct braking energy to the second energy storage device when the driving mode of the micro-hybrid vehicle corresponds to the slow-down mode.

10. The computer-implemented method of claim 9, wherein the fuzzy logic is configured to cause the processor to provide the starting electric current using energy from the second energy storage device when the first energy storage device does not have sufficient energy to provide the starting electric current.

11. The energy storage system of claim 10, wherein the fuzzy logic is configured to cause the processor to direct the braking energy to the first energy storage device when the driving mode of the vehicle corresponds to the slow-down mode.

12. The energy storage system of claim 11, wherein the driving mode comprises an engine-off mode, and wherein the fuzzy logic is configured to cause the processor to activate the at least one of the electrical accessories when a first current SOC of the second energy storage device is suitable for the at least one of the electrical accessories and when driving mode corresponds to the engine-off mode.

13. The energy storage system of claim 12, wherein the driving mode comprises an acceleration mode, and wherein the fuzzy logic is configured to cause a regulation device to activate power boosting for the motor when the driving mode corresponds to the acceleration mode.

14. The energy storage system of claim 13, wherein the fuzzy logic is configured to cause the processor to provide the starting electric current using energy from the second energy storage device when the driving mode of the vehicle corresponds to the engine cranking mode.

15. A computer-implemented method for controlling an operation of an energy storage system of a micro-hybrid vehicle, the method comprising:
  determining, using a processor, a driving mode of the micro-hybrid vehicle, and determining a speed of the micro-hybrid vehicle when in the driving mode, wherein the driving mode comprises one of an engine-off mode, an engine cranking mode, or a slow-down mode;
  determining, using the processor, a target state of charge (SOC) of each of a first energy storage device and a second energy storage device based on the speed;
  determining, using the processor, a current SOC of each of the first energy storage device and the second energy storage device;
  determining, using the processor, an amount of power available from a regenerative event for:
    regeneration of the first energy storage device;
    regeneration of the second energy storage device;
    electrical accessories associated with the micro-hybrid vehicle; and
    a motor associated with the micro-hybrid vehicle, wherein the amount of power available from the regenerative event is determined based on a difference between the target SOC and the current SOC of each of the first energy storage device and the second energy storage device; and
  directing, using the processor, a power flow from the regenerative event to the first energy storage device, the second energy storage device, the electrical accessories associated with the micro-hybrid vehicle, and the motor associated with the micro-hybrid vehicle using a fuzzy logic and the amount of power available from the regenerative event, wherein the fuzzy logic is configured to cause the processor to:
    activate at least one of the electrical accessories when a first current SOC of the second energy storage device is suitable for the at least one of the electrical accessories and when the driving mode of the micro-hybrid vehicle corresponds to the engine-off mode;
    provide a starting electric current using energy from the first energy storage device when the driving mode of the vehicle corresponds to the engine cranking mode; and
    direct braking energy to the second energy storage device when the driving mode of the micro-hybrid vehicle corresponds to the slow-down mode.

16. The method of claim 15, wherein the fuzzy logic is configured to cause the processor to direct the braking energy to the first energy storage device when the driving mode of the micro-hybrid vehicle corresponds to the slow-down mode.

17. The method of claim 15, wherein the fuzzy logic is configured to cause the processor to provide the starting electric current using energy from the second energy storage device when the fuzzy logic determines that the first energy storage device does not have sufficient energy to provide the starting electric current.

18. The method of claim 15, wherein the fuzzy logic is configured to cause the processor to activate at least one of the electrical accessories when the current SOC of the second energy storage device is suitable for the at least one electrical accessories and when the driving mode of the micro-hybrid vehicle corresponds to a stopped mode.

19. The method of claim 15, wherein the target SOC of the first energy storage device and the second energy device is determined using a supervised learning approach.

20. The method of claim 15, wherein the fuzzy logic is configured to cause the processor to activate power boosting for the motor when the driving mode of the micro-hybrid vehicle corresponds to an acceleration mode.

* * * * *

UNITED STATES PATENT AND TRADEMARK OFFICE
CERTIFICATE OF CORRECTION

PATENT NO.        : 9,669,724 B2
APPLICATION NO.   : 14/014117
DATED             : June 6, 2017
INVENTOR(S)       : Brian C. Sisk It is certified that error appears in the above-identified patent and that said Letters Patent is hereby corrected as shown below:

In the Drawings

In Fig. 6, Sheet 6 of 11, for Tag "214", delete "Spotted" and insert --Stopped--

In Fig. 6, Sheet 6 of 11, delete Tag "308" and insert Tag --208--

In Fig. 11, Sheet 11 of 11, in Step "702", Line 7, delete "Logic an" and insert --Logic, an--

In the Specification

In Column 1, Line 45, delete "micro-hybrid vehicle" and insert --micro-hybrid electric vehicle--

In Column 1, Line 56, delete "Full hybrid systems (FHEVs)" and insert --Full hybrid electric vehicles (FHEVs)--

In Column 1, Lines 56-57, delete "Mild hybrid systems (Mild-HEVs)" and insert --Mild hybrid electric vehicles (Mild-HEVs)--

In Column 4, Line 26, delete "or a" and insert --or--

In Column 9, Line 62, delete "cycle 302" and insert --cycle 202--

In Column 10, Line 61, delete "unit 106" and insert --device 106--

In Column 11, Line 22, delete "etc..." and insert --etc.--

In Column 11, Line 49, delete "training" and insert --training.--

Signed and Sealed this
Third Day of October, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,669,724 B2

In the Claims

In Column 17, Line 42, in Claim 2, delete "storages" and insert --storage--